United States Patent [19]

Kraemer et al.

[11] 4,324,474
[45] Apr. 13, 1982

[54] MICROFILMING SYSTEM

[75] Inventors: Edward J. Kraemer, Canoga Park; Robert D. Therien, Newbury Park; Michael W. Rudy, Thousand Oaks; Frederick E. Walsh, Reseda; Han J. Lee, Simi Valley; Ronald Bell, North Hollywood; Thomas D. Horning, Sepulveda, all of Calif.

[73] Assignee: Terminal Data Corporation, Woodland Hills, Calif.

[21] Appl. No.: 152,071

[22] Filed: May 21, 1980

[51] Int. Cl.³ .................. G03B 27/58; G03B 27/64; G03B 27/80
[52] U.S. Cl. .................................... 355/65; 355/68; 355/74; 355/75; 355/76
[58] Field of Search ................. 355/53, 54, 25, 64, 355/65, 68, 74–76, 14 C

[56] References Cited

U.S. PATENT DOCUMENTS

| | | |
|---|---|---|
| 2,881,658 | 4/1959 | Bornemann . |
| 3,601,487 | 8/1971 | Burton et al. ............... 355/53 |
| 3,767,302 | 10/1973 | Roberts et al. ............. 355/53 |
| 3,988,062 | 10/1976 | Burton et al. ............... 355/23 |
| 4,087,179 | 5/1978 | Conkerton .................. 355/76 |
| 4,135,810 | 1/1979 | Walter ...................... 355/75 X |
| 4,148,579 | 4/1979 | Axelrod et al. ............. 355/64 X |
| 4,208,123 | 6/1980 | Stevenson .................. 355/76 X |
| 4,218,133 | 8/1980 | Biedermann ................ 355/74 X |

FOREIGN PATENT DOCUMENTS 2623007  12/1977  Fed. Rep. of Germany ........ 355/65

OTHER PUBLICATIONS

Envision Microsystems, Inc., "Microcopy 800".

Primary Examiner—L. T. Hix
Assistant Examiner—W. J. Brady
Attorney, Agent, or Firm—Harry R. Lubcke

[57] ABSTRACT

A system for microfilming documents that employs microprocessor control to insure fault-free operation. The aspects of operation; such as document present, size of document, size of photographic mask, the exposure parameter, and system "ready", must meet necessary criteria, or the microprocessor will halt operations and present a human-readable response as to the cause.

Substitutional tables for supporting documents are available, to relate to the characteristics of the document.

Simultaneous conflicting commands are executed sequentially according to a priority sequence.

15 Claims, 6 Drawing Figures

MICROFILMING SYSTEM

BACKGROUND OF THE INVENTION

This invention relates to micro-photocopying documents with a machine that is fail-safe with respect to the machine and the operator.

U.S. Pat. No. 3,988,062 discloses a micro-photocopy recorder that automatically moves documents and, if desired, turns them over for copying from both sides.

Non-responsive logic is utilized. A state counter determines the process steps.

U.S. Pat. No. 3,601,487 discloses a microfiche-microfilm camera. It may be used as the camera only of the present invention.

U.S. Pat. No. 3,767,302 discloses another microfiche-microfilm camera. It may be used as the camera only of the present invention.

U.S. Pat. No. 2,881,658 discloses a photographic recording apparatus directed toward photographing code bits as well as a document upon microfilm. Additionally, a degree of automation is provided by a number of shafts, cams and switches. The apparatus is largely mechanical.

SUMMARY OF THE INVENTION

An automatic system is provided for photographing documents to microfilm or microfiche, one document at a time.

A plurality of tables to support the document are substitutionally available for microfilming plural types of documents, including transparencies and the pages of bound books.

A suitably programmed microprocessor controls various functions, such as; verifying the presence and also the size of a document upon the table, verifying the ready status of the camera, adjusting the size of the mask according to the size of the document, controlling the shutter, and regulating the exposure of the film according to an input from an exposure control.

The operator is assisted by the microprocessor. If an incorrect manipulation is carried-out, or if an incorrect command is given, the microprocessor will not execute the step involved. Instead, it will give a human-readable response as to the nature of the error, leading to its correction by the operator.

DETAILED DESCRIPTION OF THE PREFERRED EMBODIMENTS

Figure 1:
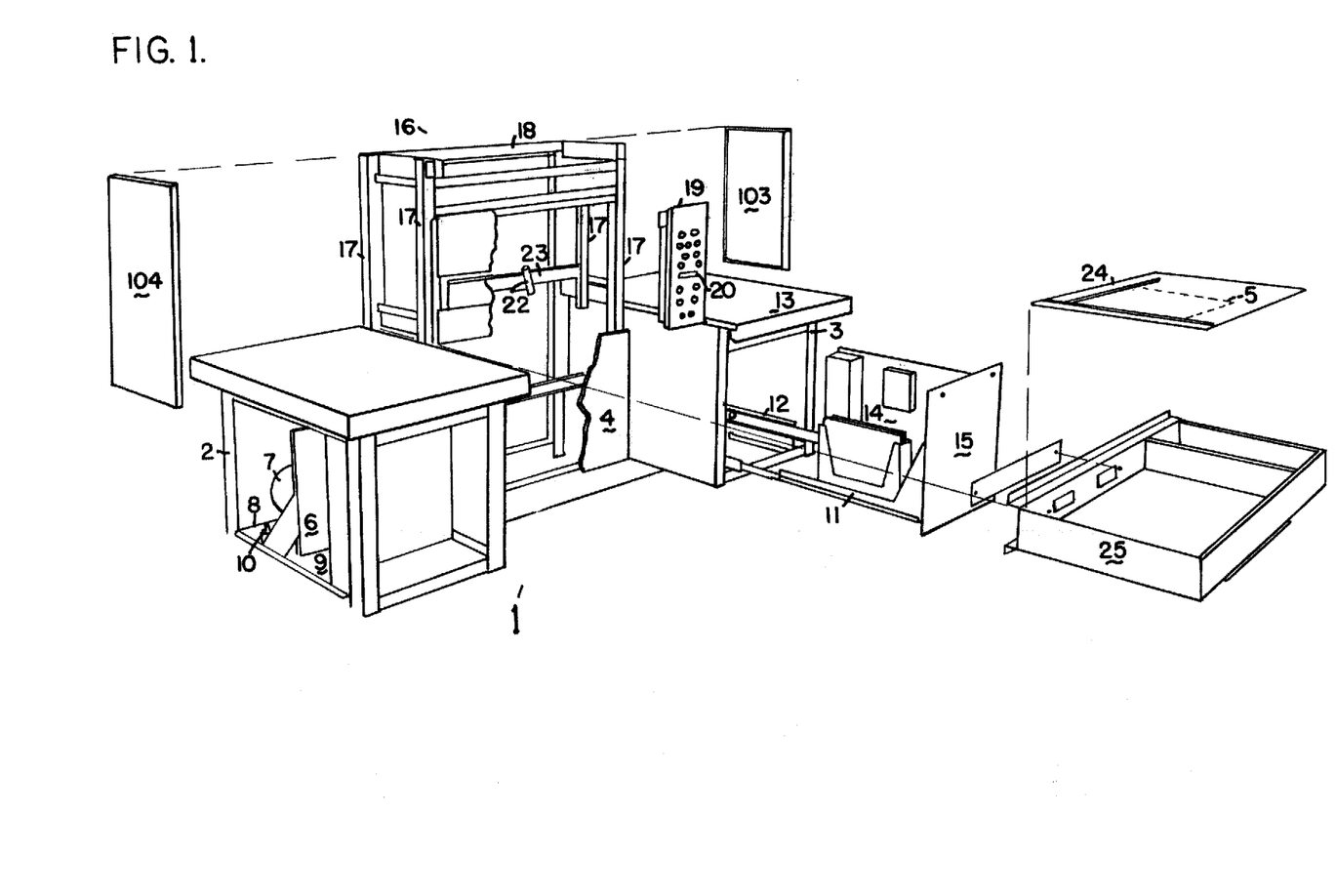
FIG. 1 shows an exploded perspective view of the lower portion of the apparatus. Single dashed lines indicate how the parts are joined.

In FIG. 1, numeral 1 identifies, in general, the base of the apparatus. An at left cabinet 2 contains mechanical elements, while an at right cabinet 3 contains microprocessor and electrical elements. A central support 4, shown in part, supports the table selected to support document 5.

Centrally within cabinet 2 there is panel 6, which is disposed vertically and which supports a blower-vacuum pump assembly 7. A horizontal base 8 is rigidly attached to the panel and is resiliently mounted to bottom 9 of cabinet 2 by mounts 10.

Within cabinet 3, near the bottom, tray 11 is removably supported by equipment slides 12. It carries a vertical equipment panel 14 and the front panel 15.

The microprocessor, I/O circuits for the same, and power-enhancement elements for energizing electric motors and the like, for carrying-out commands imposed upon the microprocessor are there mounted.

A horizontal work surface 13 surmounts cabinet 3. It lies next to exposure table frame 25.

A rectangular parallelopiped frame generally indicated as 16 surmounts central support 4. It has four corner posts 17. These support a top framework 18, which in turn, supports an optical system and a camera, to be described later in connection with FIG. 2.

A control panel 19 is supported by frame 16, typically at the right front post 17.

This panel has push-buttons for starting, stopping and reseting the whole apparatus; automatic or "manual" adjustment of the size of the mask; "double frame" for required movement of the film in the camera for a large size document; "film low" to indicate when the film in the camera has been nearly all exposed; "finish fiche" for exposing a fiche with less than a full number of frames; "title" the whole fiche, if desired; and camera mode, as to "row","column", or "linear" (for exposing microfilm, as 16 mm film). The panel also has a digital readout line, element 20, of human-readable alphanumeric characters. Thumbwheel switches are provided for "column pitch", "margin setting", "offset setting", and "columns per fiche": i.e., the geometry of film exposures.

Photo-sensor 22 of the exposure control for the camera is adjustably mounted upon horizontal member 23. Adjustment is provided so that the photo-sensor will view a light or a blank part of the document involved, and will not view a black area, such as the letter of a headline.

Covers, typically of sheet metal, are provided for essentially every side of each of bases 2, 3 and 4, to eliminate stray ambient light and to otherwise enclose the apparatus.

Figure 2:
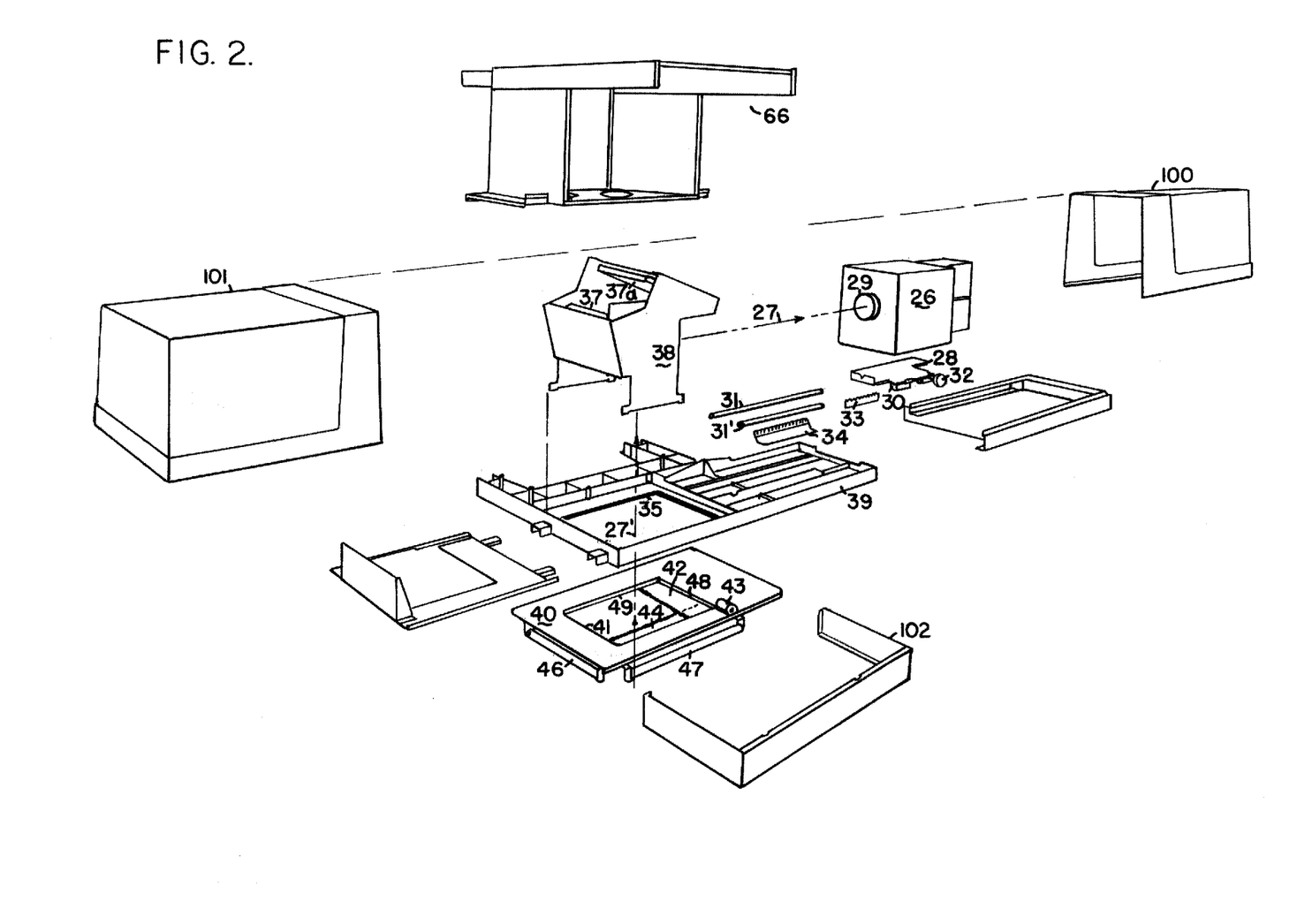
FIG. 2 shows the same for the upper portion of the apparatus.

In FIG. 2 camera 26 records the image of the document on microfilm or microfiche, as may be desired. This camera may be the one disclosed in U.S. Pat. Nos. 3,601,487 or 3,767,302 previously mentioned herein, or the one of U.S. patent application Ser. No. 050,731, filed June 21, 1979.

The optical axis 27 of the camera is horizontal. The camera is mounted upon slide plate 28, so that the position of the camera can be changed horizontally. This is to allow focusing and to change the position when lens 29 is changed from a lens of one focal length to a lens of a different focal length.

Such a change changes the reduction ratio from document to image on the film. In a typical embodiment a lens of 67 mm focal length gives a reduction of 24 times. A lens of 35 mm focal length gives a reduction of 48 times.

Slide plate 28 has a pair of journals 30, which slide upon a pair of rods 31, 31'. Careful adjustment of the horizontal camera location is possible by means of a pinion, shaft and knob assembly 32, which coacts with stationary rack 33. A stationary calibrated scale 34 provides a reference for making predetermined adjustments of the camera position for each of lenses 29 of different focal length.

These several parts are assembled onto horizontal frame 39, which in front of the camera has a large rectangular aperture 35.

Since the document to be microfilmed is horizontally disposed in this system, the optical axis of the camera. must be vertical as it impinges upon the document.

This is accomplished by optically reflective means, such as mirrors 37 and 37a, or an equivalent combination for effecting a right-angle change of direction of the light. The optical system is thus orthogonal.

A three-point attachment to rigid housing 38 is used for each mirror to enable easy adjustment of each mirror. The housing has an open side toward the camera. It is fastened to horizontal frame 39 essentially centrally with respect to aperture 35.

Optical axis 27' then proceeds vertically downward through the aperture. The light flux for the photography passes from illuminated document 5, up axis 27', is reflected by mirrors 37 and 37a, passes horizontally along axis 27 and enters lens 29.

Mask support 40 is located below the mirrors along axis 27'. This horizontally disposed support has a rectangular aperture 41 of substantially the same size as aperture 35.

Mask 42, which increases or decreases the longitudinal size of the aperture is formed of flexible material that is wound or unwound upon a motor-operated roller.

When it is in the "Automatic" control mode, as selected on control panel 19, activation of roller motor 43 is controlled by the determination of the size of the document as determined by sensors on the document table. The microprocessor accepts the sensor outputs and appropriately controls the motor.

Mask 44, which increases or decreases the transverse size of aperture 41 is also formed of flexible material. Typically, it is manually wound or unwound upon a roller.

Mask 42 may also be activated by manual means. There are two adjacent push-buttons on control panel 19, one for opening the effective size of aperture 41 and the other for closing it. The push-buttons control roller motor 43.

The masks are drawn across aperture 41 upon taut cables, to which a metal edge of the mask is attached. Upon being retracted, not only are pulleys for the cables, but also the roller, are all connected to the motor shaft. The mask is thus neatly stored upon the roller when retracted.

Typically, white light fluorescent tubular lamps 46, 47, 48 & 49 are attached to the under side of mask support 40. The lamps are thus placed to shine upon a document below. Eight lamps are normally employed. The number of lamps and the wattage of each depend upon the use of an effective "f" number for lens 29, and upon the photographic "speed" of the film employed in camera 26.

The substitutional document table embodiments are all supported in frame 25. This is shown in FIG. 1 to be roughly square and to have a depth of approximately 10 centimeters (cm).

Basic copy board 24 fits within frame 25, resting upon the top thereof. This board has only orthogonal edge guide 21 and sensors on the underside that are positioned to sense a usual 21.5 by 28 cm, and an oversize document, typically double size, 28 by 44 cm. The sensor influenced by paper of usual size concomitantly provides information that a document is upon the table; thus, automatic steps to photograph the same are enabled. The usual size sensor is 57; the double size sensor is 57'.

Figure 3:
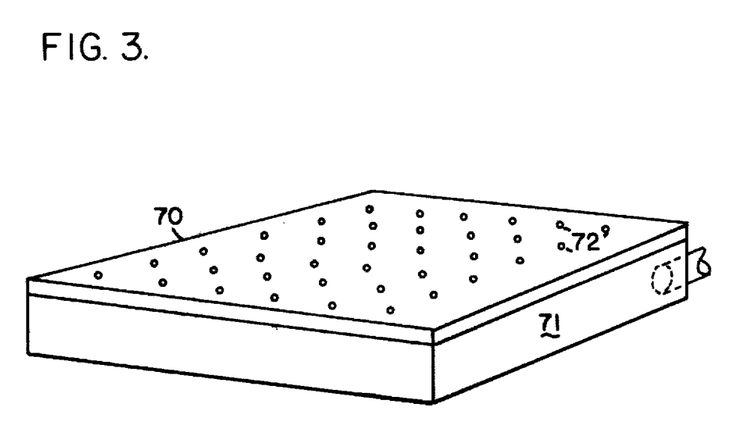
FIG. 3 shows a perspective view of a vacuum table for documents.

Vacuum copy board 70, shown in FIG. 3, has characteristics similar to those of copy board 24. It substitutionally fits within frame 25. It is formed with a hollow air-tight plenum 71 that is disposed beneath the top surface upon which the document lays. The plenum is connected to a vacuum-blower capable of maintaining a vacuum of approximately 40 cm of water within the plenum.

Numerous holes 72 in the top surface of the copy board 70 cumulative maintain the vacuum to be exerted on the under side of the document. Thus, ambient air pressure holds the document smoothly against the top planar surface of the vacuum copy board.

Figure 4:
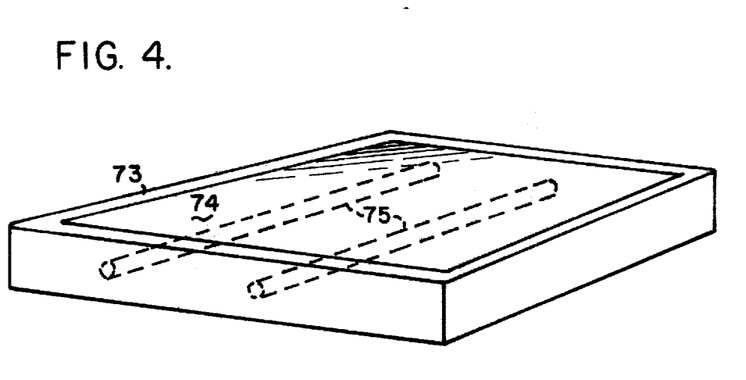
FIG. 4 shows the same for an illuminated table for transparencies.

Illuminated copy board 73, shown in FIG. 4, has a translucent surface 74. This may be frosted glass or lucite that is sufficiently thick to remain planar for supporting X-ray negatives or the like.

Board 73, the whole structure, has a depth of approximately 8 cm. This is sufficient to house plural sources of illumination, such as fluorescent lamps 75.

Substitutionally, a relatively bright whole glowing panel may be used, utilizing electro-luminescense.

Figure 5:
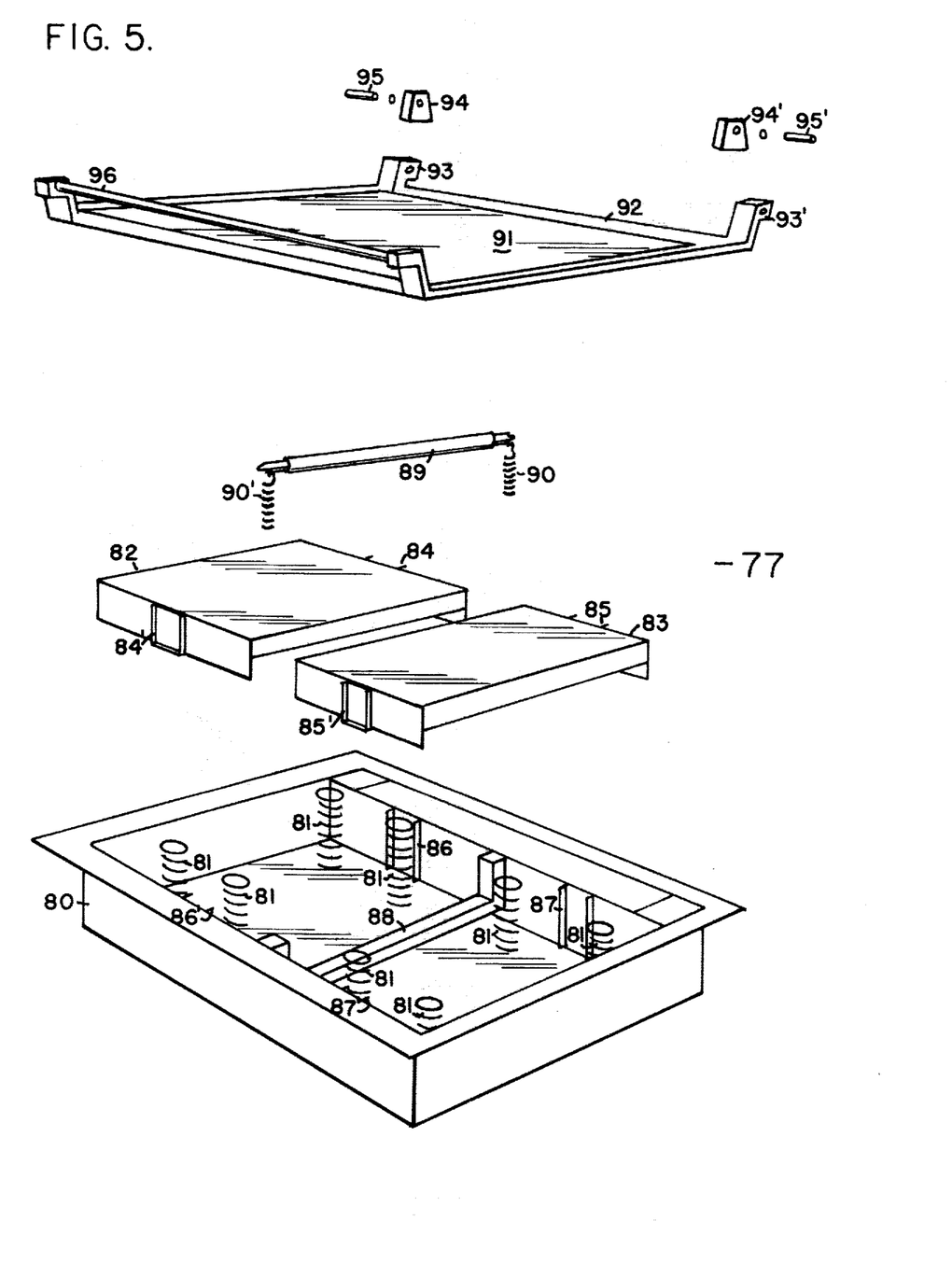
FIG. 5 shows an exploded perspective view of a table for holding bound books.

For obtaining satisfactory micro-images from one or a pair of pages from a bound book a spring-supported copy board 77 is placed within frame 25.

This copy board is shown in an exploded view in FIG. 5.

Housing 80 fits directly into frame 25, having a pan-like configuration that is approximately 10 cm deep. Four compression springs 81 are positioned at the corners of major platen 82 and four more at the corners of minor platen 83. Projections 84, 84' & 84, 85= upon these platens slide vertically in guides 86, 86' & 87, 87', respectively. Spacer 88 fits between and separates the platens.

Binder bar 89 has tension springs 90 and 90' at each end, which springs are fastened into spacer 88.

Transparent member 92 is enclosed by frame 92. The transparent member may be tempered glass having non-reflective properties and a thickness of 5.6 millimeters (mm).

A hinge 93, 93' is provided at each end on a corner, having pieces 94 and 94' that are fastened to housing 80 by pins 95 and 95', respectively. An elongated handle 96 runs the length of the side of the frame opposite to the hinges.

In operation, a book is opened to the desired page and placed upon the "floating" platens. The binder bar is placed between adjacent pages at the binding and exerts a force upon the binding to cause the book to lay flat. Thereafter, the transparent member is brought down over the book. The whole assembly depresses springs 81 sufficiently so that the book pages are forced flat.

Various covers, typically of sheet metal with an inwardly turned lip for rigidity, are employed for the structures of FIGS. 1 and 2. In sum, these covers totally enclose the structures. Those that perform a significant additional function, such as eliminating ambient light from the optical system, have been shown.

In FIG. 2, inverted "U" shaped cover 100 provides a light-tight enclosure for camera 26, also hood 66.

Similar cover 101 performs an equivalent function for mirror assembly 38. It is attached to the basic machine in a mirror-image relationship to cover 100.

Thin, "U" shaped, cover 102 essentially surrounds mask support 40 and acts to shield light from document-illuminating lamps 46-49.

In FIG. 1, right upper cover 103 and left upper cover 104 are illustrative of optically significant covers on the lower part of the apparatus.

Camera 26 is stationary during operation of the system. It is moved for focusing adjustment, or to change the demagnification ratio by changing lens 29 to one of another focal length.

The mechanical elements in cabinet 2 and the microprocessor and electrical elements in cabinet 3 comprise the major weight of the system. Accordingly, the center of gravity of the apparatus is relatively low.

Figure 6:
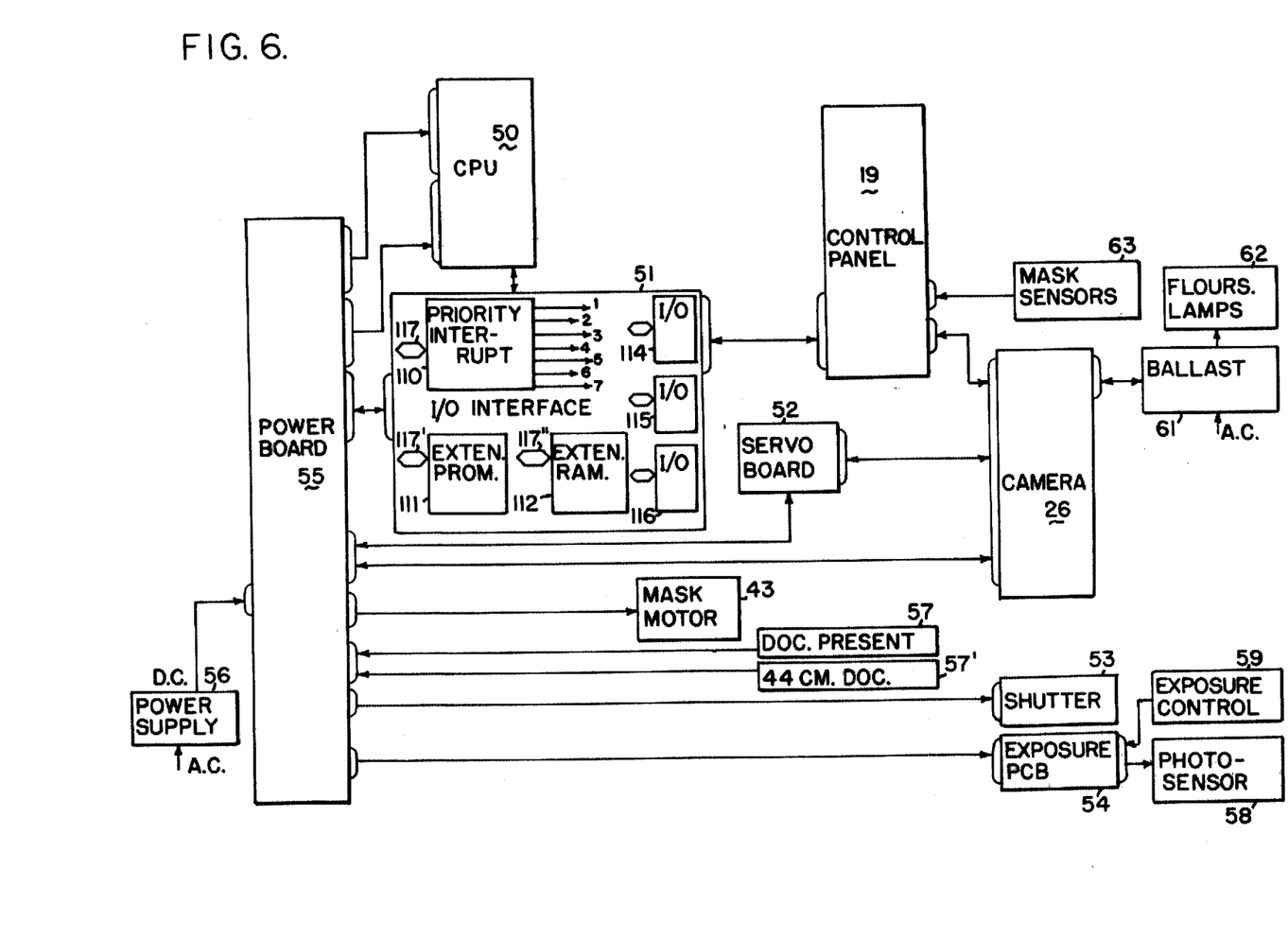
FIG. 6 is a schematic wiring block diagram of the microprocessor, including the input/output (I/O) interface and the elements that are controlled by the microprocessor.

FIG. 6 is the block diagram of the microprocessor and the schematic wiring therefrom to the whole system.

Central processing unit (CPU) 50 may be the available Type 8010. It is programmed to accept and execute correct regimens and to reject incorrect regimens, in the latter case giving a visual readout to the operator as to what the proper step should be.

Input/output interface unit (I/O) 51 is multiply connected to the CPU to give direction to the several processes that are to be controlled. This circuit provides a "slave" arrangement for the other elements of the system, such as camera operation, shutter timing, and exposure. That is, the other elements of the system have certain control electronics, but the micro-processer originates the commands.

These required energizing commands and the sequence of them comprise information that is resident in the CPU, once it has been programmed. The other elements of the system merely execute the program promulgated by the CPU.

I/O unit 51 also has multiple connections, bidirectional, connecting to control panel 19, as by a 50 wire flat cable having 25 circuit conductors and 25 ground conductors. Push-button commands originate at panel 19. These enter the input area of the unit and from there enter microprocessor 50.

In the CPU the sequencer is programmed by entering the instructions required for the several operation routines from the PROM (programmable read only memory).

RAM (random access memories) memories are also available, and are used for containing the stack, temporary storage, and to store status flags. The registers are instructed according to the routine being carried out.

Use of the PROM memory allows operational routines to be changed, should this be necessary. Normally, all of the operating choices desired are available to the operator by means of push button or thumbwheel switches on control panel 19. An example is the push button "Linear". This operates the camera and coacting parts of the apparatus to receive micro-images on strip microfilm, say of 16 mm width.

For microfiche, normally of 15 mm width film, "Row" and "Column" modes are available at separate push buttons.

A further illustrative instruction is available; i.e., "Skip-frame". This instructs the camera to advance one frame in a row or a column, as the case may be, but not to make any exposure for that frame.

A typical CPU 50, such as the National Semiconductor 8010, employs MOS elements that operate at low signal and low energy levels.

I/O interface 51 employs TTL elements that operate at significantly higher signal and energy levels. This makes possible driving servo input circuits 52, the logic of camera 26, the electrically operated shutter 53 for the camera, and the time duration exposure entity 54.

Input/Output interface unit 51 includes priority interrupt device 110. When an element of the apparatus, say camera 26, requires service external to the CPU 50, it puts in a request to interface 51. Interrupt device 110 contains the information required to arrange the proper priority in the case of conflicts.

For example, assume that camera 26 is in the midst of making a photographic exposure. Further assume that at this time the operator pushes the "Film feed" button on control panel 19. These two operations cannot take place at the same time on the one piece of film.

Successfully completing an exposure is given the highest priority. Accordingly, this function is completed and subsequently the "Film feed" command is executed. Typically, interrupt device 110 is structured to provide a sequence of priorities from 1 to 7; 1 being highest. The 1 priority is assigned to exposure-related functions.

Bidirectional arrow 117, at the input (left) side of device 110, signifies connections to and from CPU 50 for accomplishing the priority functioning.

As embodied in the present system, functioning of the CPU 50 requires approximately an 8K PROM memory. The typical 8010 CPU has only a 4K memory. Accordingly, extended PROM memory extends the programmable read only memory capability. Arrow 117' connects memory 111 to CPU 50.

Similarly, extended RAM memory 112 extends the random access memory; typically to 8K if this is required. Arrow 117" connects this memory to the CPU.

Further, additional input/output ports, as 114, 115, 116, are provided in the interface unit to serve between the CPU and the other elements of the apparatus system.

The connections between interface 51 and the recited other entities are made through power board 55. In addition to providing straight-through connections that are shown at the bottom of FIG. 6, low voltage energizing interfacing for powering the several entities is also provided.

D.C. power supply 56 is connected to power board 55, and it typically supplies +12 volts, −12 volts, +5 volts and −5 volts.

Mask adjustment motor 43 is controlled and powered from power board 55.

An input from document table sensor 57 passes through power board 55 to CPU 50. This sensor verifies that a document is in position upon the table.

Another sensor 57', spaced away from sensor 57, detects an oversize document, such as a 28 by 44 centimeter (cm) document rather than the usual 21.5 by 28 cm size.

Shutter 53 is connected to and from board 55 by a number of wires, such as 22 wires, which may have the configuration of a flat cable.

Exposure control printed circuit board (PCB) 54 is also connected to and from power board 55. It is further connected to photosensor 58, which element includes a preamplifier. It is still further connected to exposure control 59. This is mounted upon camera 26 and allows pertinent exposure adjustments to be made by controlling the duration of the open status of the shutter.

The shutter may be as disclosed in U.S. Pat. No. 3,918,077. It is contained within the camera. The camera 26 may be according to U.S. Pat. Nos. 3,601,487 and 3,767,302, that have been previously referred to herein.

Multiple connections between control board 19 and camera 26 accomplish connections between certain push-button and thumbwheel switches that have previously been recited, so that the camera can be controlled from the control board by the operator when such control is required.

Ballast assembly 61 controls several fluorescent lamps 62, say eight lamps. Control 61 also accepts 115 volt alternating current power.

The position of mask 42, as to degree of opening, is sensed in three positions by sensors 63. An active position, taken when a "document present" sensor is so influenced, causes mask 42 to open the masking aperture to 21.5 cm. When a second, oversize, sensor is also influenced, mask 42 is opened to an aperture of 44 cm.

Additional sensors actually control the motor that operates the mask. These may be Hall effect switches. A small permanent magnet is fastened to the mask at its terminal edge. Hall effect switches are positioned, stationary, where the mask is to stop. The magnet actuates the switch to stop mask motor 43 at such positions. This is done through control panel 19 and ultimately interface 51.

Control panel (board) 19 has manually operable switches for the control and format of the apparatus, as has been previously detailed. The status of these switches is conveyed back to interface 51 and CPU 50 to establish the desired regimen.

As heretofore set forth, tilting on a roll of microfilm or on a frame of a microfiche can be accomplished by photographing a suitable document upon table 24.

An attachment option that allows optical titling from a separate source and coacts with camera 26 can be provided. The text for the title may be from a paper tape reader, or equivalent. Such attachments are connected to power board 55 and therethrough to interface 51 and CPU 50 in a manner analogous to the shutter, exposure control, etc., as has been set forth.

We claim:

1. A microfilming system, comprising;
   (a) a support (25),
   (b) plural tables (24,70,73,91) selectively horizontally fitable upon said support to horizontally receive a document (5),
   (c) a stationary camera (26), having film, a shutter, and actuating means,
   (d) a non-image-reversing plural-reflective orthogonal optical system (29,27,27') for forming an image of said document upon said film,
   (e) adjustable mask means (42,44) intermediately disposed in said optical system relatively adjacent to said document to fix the size of the image upon said film,
   (f) means (46-49) to illuminate said document,
   (g) an exposure control (22) disposed to receive illumination reflected from said document, and
   (h) a microprocessor (50,51) for receiving information regarding the presence of (57) and the size of (57') a said document upon said table, and from the output of said exposure control, and for exercising control over said actuating means of said camera, said shutter, and the size of the opening of said mask, in accordance with the information received, on a priority interrupt basis in which exposure of said film has the highest priority.

2. The microfilming system of claim 1, in which said fitable table comprises;
   (a) a planar surface (24) for receiving said document (5),
   (b) at least one sensor (57) functionally related to said surface to sense the presence of a said document, and
   (c) a connection from said one sensor (57) to said microprocessor (50) to enable said microprocessor for exposing the microfilm.

3. The microfilming system of claim 2, which additionally comprises;
   (a) an additional sensor (57'), spaced from said at least one sensor (57) to sense the presence of an oversize document upon said planar surface, and
   (b) a connection from said additional sensor to said microprocessor (50) to enable a command therefrom to increase the size of said adjustable mask means.

4. The microfilming system of claim 1, in which said fitable table comprises;
   (a) a vacuum platen (70) for receiving a document, said platen having holes (72) distributed thereover, and
   (b) a plenum (71) below said holes to convey vacuum to said holes.

5. The microfilming system of claim 1, in which;
   (a) said stationary camera (26) is disposed to have the optical axis thereof (27) parallel to said table (24), and
   (b) said orthogonal optical system includes plural reflective means (37) to redirect the optical axis to perpendicular (27') to said table.

6. The microfilming system of claim 5, which additionally includes;
   (a) means to horizontally adjust (30,31,32,33) the position of said camera (26)
   to allow calibrated (34) focusing of selected lenses (29) of different focal lengths.

7. A microfilming system, comprising;
   (a) a support (25),
   (b) a table (77) having spring-loaded planar platens (84,85) for receiving an open book, said table horizontally fitable upon said support,
   (c) a planar transparent member (91) surmounting said planar platens and bearing upon said open book,
   (d) a stationary camera (26) having film, a shutter and actuating means,
   (e) an orthogonal optical system (29,27,27') for forming an image of said document upon said film,
   (f) adjustable mask means (42,44) intermediately disposed in said optical system to fix the size of the image upon said film, and
   (g) a microprocessor (50,51) for receiving information regarding the presence of (57) and the size of (57') a said document upon said table, and for exercising control of said actuating means of said camera, said shutter, and the size of the opening of said mask, in accordance with the information received.

8. The microfilming system of claim 7, in which said fitable table (77) additionally comprises;
   (a) a binder bar (89), and
   (b) tension means (90,90'),
to urge said binder bar toward said open book upon said planar platens.

9. The microfilming system of claim 7, in which said fitable table (77) additionally comprises;
   (a) a housing (80),
   (b) guides (86,86',87, 87') attached to sides of said housing, and
   (c) projections (84,84',84,85') disposed upon said planar platens to slide within said guides.

10. A microfilming system, comprising;
   (a) a support (25)
   (b) at least one table (24) selectively fitable upon said support to receive a document (5),
   (c) a stationary camera (26), having film, a shutter and actuating means,
   (d) an orthogonal optical shutter (29,27,27') for forming an image of said document upon said film,
   (e) adjustable mask means (42,44) intermediately disposed in said optical system to fix the size of the image upon said film, which include;
     (1) means to adjust a portion (42) of said mask means as to the width of the document,
     (2) further means to adjust another portion (44) of said mask means as to the height of the document, and
     (3) still further means (43) mechanically connected to at least one said portion of said mask means,
   (f) a microprocessor (50,51) for receiving information regarding the presence of (57) and the size of (57') a said document upon said table for exercising control over said actuating means of said camera and said shutter, and
   (g) an electrical connection from said still further means to said microprocessor (50,51) for adjusting the aperture of said mask means as controlled by said microprocessor.

11. The microfilming system of claim 10, in which said fitable table (73) comprises;
   (a) a translucent planar surface (74) for receiving atop thereof a transparency to be microfilmed, and
   (b) means to illuminate (75), said transparency disposed below said translucent planar surface.

12. A microfilming system, comprising;
   (a) a support (25),
   (b) at least one table (24) selectively fitable upon said support to receive a document (5),
   (c) a stationary camera (26), having film, a shutter and actuating means,
   (d) an orthogonal optical system (29,27,27') for forming an image of said document upon said film,
   (e) adjustable mask means (42,44) intermediately disposed in said optical system to fix the size of the image upon said film,
   (f) means (46-49) to illuminate said document,
   (g) an exposure control (22) disposed to receive illumination reflected from said document, and
   (h) a microprocessor (50,51) for receiving information regarding the presence of (57) and the size of (57') a said document upon said table, and from the output of said exposure control, and for exercising control over said actuating means of said camera, said shutter, and the size of the opening of said mask, in accordance with the information received, which microprocessor comprises;
     (A) a central processor unit (50),
     (B) an input-output interface (51) having plural inputs and outputs,
       said interface connected to said central processor unit,
     (C) a first input of said interface connected to said one sensor (57)
       and a corresponding output of said interface connected to said actuating means (52) of said camera (26), (D) a second input of said interface connected to said additional sensor (57')
       and a corresponding output of said interface connected to said actuating means (52) of said camera (26), (E) a third input of said interface also connected to said one sensor (57) and to said additional sensor (57')
       and a corresponding output of said interface connected to said mask means (43) to adjust the aperture of the mask corresponding to the size of said document, and (F) a fourth input of said interface connected to said exposure control (54)
       and a corresponding output connected to actuating means (53) for said shutter.

13. The microprocessor of claim 12, which additionally includes operator control means (19) having;
   (a) means for manual adjustment of said mask (42),
   (b) means to complete the exposures upon a fiche at less than the possible number of frames thereupon, and
   (c) means for manually determining the geometry of the exposures upon the film within the camera (26).

14. The microprocessor of claim 12, in which the input-output interface (51) additionally includes;
   (a) a priority interrupt device (110) connected to said central processor unit (50), having;
     (1) priority-determining means to accept each output command of said central processor unit (50) and to time-sequence each said output according to a predetermined order of priority.

15. The microprocessor of claim 12, in which the input-output interface (51) additionally includes;
   (a) extended memory elements (111,112), each connected to corresponding memory elements in said central processor unit (50)
to extend the memory capability of said central processor unit.

* * * * *